(12) United States Patent
Hinker

(10) Patent No.: US 7,406,681 B1
(45) Date of Patent: *Jul. 29, 2008

(54) AUTOMATIC CONVERSION OF SOURCE CODE FROM 32-BIT TO 64-BIT

(75) Inventor: Paul J. Hinker, Longmont, CO (US)

(73) Assignee: Sun Microsystems, Inc., Menlo Park, CA (US)

( * ) Notice: Subject to any disclaimer, the term of this patent is extended or adjusted under 35 U.S.C. 154(b) by 569 days.

This patent is subject to a terminal disclaimer.

(21) Appl. No.: 09/686,628

(22) Filed: Oct. 12, 2000

(51) Int. Cl.
*G06F 9/45* (2006.01)
(52) U.S. Cl. ............................. 717/137; 717/106
(58) Field of Classification Search ........ 717/106–119, 717/136–145, 162–166
See application file for complete search history.

(56) References Cited

U.S. PATENT DOCUMENTS

| | | | |
|---|---|---|---|
| 4,685,082 A | 8/1987 | Cheung et al. ................. 365/49 |
| 5,021,947 A | 6/1991 | Campbell et al. | |
| 5,073,851 A | 12/1991 | Masterson et al. .......... 395/425 |
| 5,075,847 A | 12/1991 | Fromme | |
| 5,107,417 A | 4/1992 | Yokoyama | |
| 5,119,465 A | 6/1992 | Jack et al. .................. 395/500 |
| 5,146,593 A | 9/1992 | Brandle et al. ............. 395/700 |
| 5,168,563 A | 12/1992 | Shenoy et al. | |
| 5,179,702 A | 1/1993 | Spix et al. | |
| 5,274,813 A | 12/1993 | Itoh | |
| 5,274,821 A | 12/1993 | Rouquie | |
| 5,297,274 A | 3/1994 | Jackson | |
| 5,301,312 A | 4/1994 | Christopher, Jr. et al. | |
| 5,325,499 A | 6/1994 | Kummer et al. | |
| 5,353,401 A | 10/1994 | Iizawa et al. | |
| 5,390,314 A | 2/1995 | Swanson .................... 395/500 |
| 5,438,659 A | 8/1995 | Notess et al. | |
| 5,450,542 A | 9/1995 | Lehman et al. | |
| 5,481,708 A | 1/1996 | Kukol | |
| 5,485,619 A | 1/1996 | Lai et al. ..................... 395/700 |
| 5,497,458 A | 3/1996 | Finch et al. | |
| 5,526,507 A | 6/1996 | Hill | |
| 5,535,364 A | 7/1996 | Resman et al. | |
| 5,535,393 A | 7/1996 | Reeve et al. | |

(Continued)

FOREIGN PATENT DOCUMENTS

DE 199 34 515 A1 1/2000

(Continued)

OTHER PUBLICATIONS

"Code Complete: A Practical Handbook of Software Construction" by Steve McConnell, 1993, Microsoft Press.*

(Continued)

*Primary Examiner*—Ted T. Vo
(74) *Attorney, Agent, or Firm*—Finnegan, Henderson, Farabow, Garrett & Dunner, LLP

(57) ABSTRACT

In accordance with methods and systems consistent with the present invention, a system that automatically generates 32-bit to 64 bit interfaces to 64-bit code is provided. These interfaces provide for the use of optional parameters and, because they are written in 64-bit code, also allow for parameter checking. These interfaces are automatically generated to allow a programmer to maintain compatibility with 64-bit libraries from 32-bit source code.

27 Claims, 6 Drawing Sheets

U.S. PATENT DOCUMENTS

| | | | |
|---|---|---|---|
| 5,539,907 A | 7/1996 | Srivastava et al. | |
| 5,553,235 A | 9/1996 | Chen et al. | |
| 5,574,922 A | 11/1996 | James | |
| 5,636,374 A | 6/1997 | Rodgers et al. | |
| 5,640,550 A | 6/1997 | Coker | |
| 5,650,948 A | 7/1997 | Gafter | |
| 5,673,387 A | 9/1997 | Chen et al. | |
| 5,696,937 A | 12/1997 | White et al. ................. | 395/469 |
| 5,710,727 A | 1/1998 | Mitchell et al. | |
| 5,734,822 A | 3/1998 | Houha et al. | |
| 5,737,605 A | 4/1998 | Cunningham et al. | |
| 5,740,431 A | 4/1998 | Rail | |
| 5,740,433 A | 4/1998 | Carr | |
| 5,745,897 A | 4/1998 | Perkins et al. | |
| 5,748,892 A | 5/1998 | Richardson | |
| 5,754,820 A | 5/1998 | Yamagami | |
| 5,761,426 A | 6/1998 | Ishizaki et al. | |
| 5,774,724 A | 6/1998 | Heisch | |
| 5,787,285 A | 7/1998 | Lanning | |
| 5,805,795 A | 9/1998 | Whitten | |
| 5,812,799 A | 9/1998 | Zuravleff et al. | |
| 5,835,705 A | 11/1998 | Larsen et al. | |
| 5,860,024 A | 1/1999 | Kyle et al. | |
| 5,867,735 A | 2/1999 | Zuravleff et al. | |
| 5,890,171 A | 3/1999 | Blumer et al. | |
| 5,905,856 A | 5/1999 | Ottensooser | |
| 5,913,223 A | 6/1999 | Sheppard et al. ........... | 711/118 |
| 5,920,895 A | 7/1999 | Perazzoli, Jr. et al. ...... | 711/163 |
| 5,940,616 A | 8/1999 | Wang | |
| 5,943,499 A | 8/1999 | Gillies et al. | |
| 5,968,114 A | 10/1999 | Wentka et al. | |
| 5,970,510 A | 10/1999 | Sher et al. | |
| 5,974,510 A | 10/1999 | Cheng et al. | |
| 5,987,479 A | 11/1999 | Oliver | |
| 5,991,708 A | 11/1999 | Levine et al. | |
| 6,006,031 A | 12/1999 | Andrews et al. ............ | 395/701 |
| 6,009,514 A | 12/1999 | Henzinger et al. | |
| 6,014,517 A | 1/2000 | Shagam et al. | |
| 6,023,583 A | 2/2000 | Honda | |
| 6,049,798 A | 4/2000 | Bishop et al. | |
| 6,049,855 A | 4/2000 | Jeddeloh | |
| 6,052,708 A | 4/2000 | Flynn et al. | |
| 6,052,763 A | 4/2000 | Maruyama | |
| 6,055,368 A | 4/2000 | Kunioka | |
| 6,065,019 A | 5/2000 | Ault et al. | |
| 6,066,181 A * | 5/2000 | DeMaster ................... | 717/148 |
| 6,072,951 A | 6/2000 | Donovan et al. | |
| 6,077,312 A | 6/2000 | Bates et al. | |
| 6,081,868 A | 6/2000 | Brooks | |
| 6,088,771 A | 7/2000 | Steely, Jr. et al. | |
| 6,098,169 A | 8/2000 | Ranganathan | |
| 6,101,325 A | 8/2000 | Flaat ........................... | 395/705 |
| 6,108,343 A | 8/2000 | Cruickshank et al. | |
| 6,119,198 A | 9/2000 | Fromm | |
| 6,141,692 A | 10/2000 | Loewenstein et al. ...... | 709/234 |
| 6,145,054 A | 11/2000 | Mehrotra et al. | |
| 6,167,565 A | 12/2000 | Kanamori | |
| 6,173,327 B1 | 1/2001 | De Borst et al. | |
| 6,173,368 B1 | 1/2001 | Krueger et al. | |
| 6,205,537 B1 | 3/2001 | Albonesi | |
| 6,253,252 B1 | 6/2001 | Schofield | |
| 6,263,485 B1 | 7/2001 | Schofield | |
| 6,263,489 B1 | 7/2001 | Olsen et al. | |
| 6,269,457 B1 | 7/2001 | Lane | |
| 6,282,702 B1 | 8/2001 | Ungar | |
| 6,286,130 B1 | 9/2001 | Poulsen et al. | |
| 6,295,600 B1 | 9/2001 | Parady | |
| 6,304,951 B1 | 10/2001 | Mealey et al. ............. | 711/206 |
| 6,311,320 B1 | 10/2001 | Jibbe | |
| 6,314,429 B1 | 11/2001 | Simser ........................ | 707/103 |
| 6,317,871 B1 | 11/2001 | Andrews et al. ............ | 715/705 |
| 6,341,338 B1 | 1/2002 | Dennie | |
| 6,345,384 B1 | 2/2002 | Sato | |
| 6,351,845 B1 | 2/2002 | Hinker et al. | |
| 6,353,829 B1 | 3/2002 | Koblenz et al. | |
| 6,353,869 B1 | 3/2002 | Ofer et al. | |
| 6,366,994 B1 | 4/2002 | Kalyur | |
| 6,367,071 B1 | 4/2002 | Cao et al. | |
| 6,369,725 B1 * | 4/2002 | Busaba ........................ | 341/84 |
| 6,430,657 B1 | 8/2002 | Mittal et al. | |
| 6,434,714 B1 | 8/2002 | Lewis et al. | |
| 6,434,741 B1 | 8/2002 | Mirani et al. | |
| 6,438,745 B1 | 8/2002 | Kanamaru et al. .......... | 717/137 |
| 6,442,162 B1 | 8/2002 | O'Neill et al. | |
| 6,473,833 B1 | 10/2002 | Arimilli et al. | |
| 6,480,818 B1 | 11/2002 | Alverson et al. | |
| 6,496,902 B1 | 12/2002 | Faanes et al. ............... | 711/118 |
| 6,502,136 B1 | 12/2002 | Higuchi et al. | |
| 6,523,090 B2 | 2/2003 | Tremblay ................... | 711/125 |
| 6,542,919 B1 | 4/2003 | Wendorf et al. | |
| 6,574,725 B1 | 6/2003 | Kranich et al. | |
| 6,629,214 B1 | 9/2003 | Arimilli et al. | |
| 6,647,546 B1 | 11/2003 | Hinker et al. | |
| 6,684,296 B2 | 1/2004 | Hayter et al. | |
| 6,802,057 B1 * | 10/2004 | Hinker et al. ............... | 717/137 |
| 2001/0003831 A1 | 6/2001 | Boland | |
| 2001/0051974 A1 | 12/2001 | Saad | |
| 2002/0046201 A1 | 4/2002 | Hernbry | |
| 2002/0073360 A1 | 6/2002 | Lewis et al. | |
| 2002/0078010 A1 | 6/2002 | Ehrman et al. | |
| 2003/0061395 A1 | 3/2003 | Kingsbury et al. | |

FOREIGN PATENT DOCUMENTS

| | | |
|---|---|---|
| EP | 0 144 779 | 6/1985 |
| EP | 0 390 339 A2 | 3/1990 |
| EP | 0 703 534 A | 3/1996 |
| EP | 0 817 044 A2 | 1/1998 |
| EP | 0 965 921 A2 | 12/1999 |
| EP | 1 026 592 A2 | 2/2000 |
| EP | 1 024 432 A | 8/2000 |
| EP | 1 081 585 A1 | 3/2001 |
| FR | 2 793 908 A1 | 11/2000 |
| GB | 2 324 942 A | 11/1998 |
| GB | 2 343 029 | 4/2000 |
| GB | 2 357 873 | 4/2001 |
| JP | 03-282731 A | 12/1991 |
| JP | 07-056716 A | 3/1995 |

OTHER PUBLICATIONS

Coutant, "64-Bit Application Development for PA-RISC & IA-64", Hewlett Packard, pp. 1-26, Mar. 2000.*

Microsoft, "Microsoft Interface Definition Language (MIDL): 64-Bit Porting Guide", http://msdn.microsoft.com, pp. 1-18, Aug. 1999.*

Jacobs, "64-bit Computing", Computerworld, http://www.computerworld.com/, pp. 1-3, 1998.*

IBM Corp. 1991, "Internal Performance Measurement Counters," filed Sep. 1991, in Section No. 34, (Sep. 1991).

IBM Technical Disclosure Bulletin, "Simultaneous Viewing of Performance Monitor Data Independent of Counters<" vol. 39, No. 10 (Oct. 1996).

Metcalf, Michael, "convert.f90", CERN, Geneva 1991, 1997 pp. 1-27, ftp://ftp>numerical.rl.ac.uk/pub/MandR/convert.f90.

Handy, Jim, "The Cache Memory Book", Second Edition, Choosing Cache Policies, Copyright 1998, pp. 55, 66, 67, 155.

"Visual Basic 5.0 Introduction", Windows 95 Student Manual, 1997, XP002926932.

Cantril, B.M. et al., "ThreadMon: A Tool for Monitoring Multithreaded Program Performance", System Sicences, 1997 Proceedings of the Thirtieth Hawaii int'l Conference of Wailea, HI, USA, pp. 253-265, Jan. 7-10, 1997.

Grundy, J.C. et al., "Supporting Flexible Consistency Management Via Discrete Change Description Propagation", Software Practice &

Experience, John Wiley & Sons Ltd. Chichester, GB, vol. 26, No. 9 XP000655597, pp. 1053-1083, Sep. 1996.

Karavanic K.L. et al., "Integrated Visualization of Parallel Program Performance Data", vol. 23, No. 1, pp. 181-198, Apr. 1, 1997.

Poul-Henning Kamp, "Malloc(3) in modern Virtual Memory environments", FREEBSD Online Documentation, pp. 1, 3, 5, and 7, Apr. 5, 1996.

Xu, Miller & Naim, "Dynamic Instrumentation of Threaded Applications", Internet Article, Online, URL:ftp://ftp.cs.wisc.edu/paradyn/technical_papers/threads.pdf, pp. 1-16, Oct. 29, 1998.

Ayers, Andrew et al., "Aggressive Inling", ACM PLDI, pp. 134-145, 1997.

Hwu, Wen-Mei et al., "Inline Function Expansion for Compiling C Programs", ACM, pp. 246-257, 1989.

Ogasawara, Takeshi et al., "A Study of Exception Handling and Its Dynamic Optimization in Java", ACM OOPSLA, pp. 83-95, 2001.

Suganuma, Toshio et al., "A Region-Based Compilation Technique for a Java Just-In-Time Compiler", ACM PLDI, pp. 312-323, Jun. 2003.

Cooper, Keith D. et al., "An Experiment with Inline Substitution", Software-Practice and Experience, vol. 21 No. 6, pp. 581-601, Jun. 6, 1991.

Holland, Angela et al., "A Compiler for Selective Procedure Inlining", Proceedings of the Annual Southeast Conference, pp. 207-212, 1993.

Buckley, A. G., "Conversion to Fortran 90: A Case Study," ACM, 1994, pp. 308-353.

Purtilo, James M. et al., "Module Reuse by Interface Adaptation," Software—Practice and Experience, 1991, pp. 539-556.

"dcpid—DIGITAL Continuous Profiling Infrastructure daemon", Man pages for SCR-Installed Programs (Alpha/NT), Online <URL://research.compaq.com/SRC/dcpi/html/ntalpha/dcpi.html>, 1997, pp. 1-6.

Browne et al., "PAPI: Portable Interface to Hardware Performance Counters," Cewes Major Shared Resources Center Pet Technical Reports, vol. 99-06, 1999, Online, <URL:http://www.wes.hpc.mil/pet/tech_reports/reports/pdf/tr_9906.pdf>, pp. 3-13.

IBM Technical Disclosure Bulletin, "Caching Objects in a Data Space," Oct. 1, 1994, vol. No. 37, pp. 587-590.

Microsoft Press, "Microsoft Press Computer Dictionary: Third Edition", 1997, p. 101.

Zagha et al., "Performance Analysis Using the MIPS R10000 Performance Counters", SC96 Technical Papers, Online, <URL:http://www.supercomp.org/sc96/proceedings/SC96PROC/ZAGHA/INDEX.HTM>, Nov. 1996, pp. 1-22.

Haggander et al., "Optimizing Dynamic Memory Management in a Multithreaded Application Executing on a Multiprocessor," 1998 International Conference on Parallel Processing, Minneapolis, MN, Aug. 10-14, 1998, pp. 262-269.

Larson et al., "Memory Allocation for Long-Running Server Applications," ISMM 1998, International Symposium on Memory Management, Vancouver, BC, Canada, Oct. 17-19, 1998, vol. 34, No. 3, pp. 176-185.

European Search Report in EP Application No. 00400305.9-2211 dated Mar. 14, 2006.

Fisher, G., "An Overview of a Graphical Multilanguage Applications Environment," IEEE Transactions on Software Engineering, IEEE Service Center, XP000407052, ISSN: 0098-589, Los Alamitos, CA, vol. 14, No. 6, pp. 774-786, Jun. 1, 1988.

Nathan P. Kropp, Philip J. Koopman, Daniel P. Siewiorek, "Automated Robustness Testing of Off-the-Shelf Software Components," Institute for Complex Engineered Systems, Carnegie Mellon University, Pittsburgh, PA, pp. 230-239, 1998.

Valvano, "Debugging Strategies," Chapter 6, pp. 6.1-6.10, Real Time Debugging, Online Manual, Jun. 7, 1999, Retrieved from the Internet: <URL:http://ece.utexas.edu/{valvano/EE360P/PDF/Ch6.pdf>.

* cited by examiner

AUTOMATIC CONVERSION OF SOURCE CODE FROM 32-BIT TO 64-BIT

FIELD OF THE INVENTION

The present invention relates generally to data processing systems and, more particularly, to the automatic generation of interfaces to convert 32-bit code to 64-bit code.

BACKGROUND OF THE INVENTION

The physical memory of a computer, i.e., random access memory ("RAM"), consists of a number of cells which store information. These cells are referred to as addresses. Programs access the memory by referring to an address space. If a memory cell consists of N bits, it can hold $2^N$ different bit combinations. Thus, if a memory cell consists of 32 bits, it can hold $2^{32}$ different bit combinations. A program written for a 32-bit memory addressing scheme may access $2^{32}$ memory addresses, the equivalent of four gigabytes of RAM.

Most conventional programs follow a 32-bit addressing model. Thus, if a computer has more than four gigabytes of RAM, the processor cannot directly address all of the physical memory without using complicated memory access schemes. The same access problems may occur when accessing files maintained in a secondary storage device, e.g., a database maintained on a hard disk, which is larger than four gigabytes.

Programs originally written according to a 32-bit addressing model are unable to make calls to, or directly address, a larger address space without rewriting the source code, a time consuming and daunting task, or using complex addressing schemes. Rewriting the source code is possible only if the original source code is available.

Accordingly, a need exists for a manner of adapting source code written for a 32-bit addressing model to execute on machines having an address space larger than four gigabytes.

SUMMARY OF THE INVENTION

In accordance with methods and systems consistent with the present invention, a system that automatically generates 64-bit interfaces to programs written according to a 32-bit addressing model is provided. These interfaces are automatically generated to allow backward compatibility with programs that assume 32-bit addressing.

In accordance with an implementation of methods consistent with the present invention, a method is provided in a data processing system that receives 32-bit source code and automatically generates an interface between 32-bit source code and 64-bit library routines.

In accordance with another implementation, a method is provided in a data processing system having source code with a subprogram having at least one of an integer and logical parameter. The method reads the source code and generates a stub routine that invokes the subprogram and that converts 32-bit integer/logical parameters to 64-bit parameters and calls corresponding 64-bit library routines.

In accordance with an implementation of systems consistent with the present invention, a computer-readable memory device encoded with a program having instructions for execution by a processor is provided. The program comprises source code of a subprogram with a parameter. The program also comprises a stub routine that receives a set of parameter values and creates the values for the required parameters from the received set of parameter values to invoke the subprogram, where the received set of parameter values contains at least one of an integer and logical parameter.

In another implementation of systems consistent with the present invention, a data processing system is provided. This data processing system contains a storage device and a processor. The storage device comprises source code of a subprogram having a parameter and an interface generator that reads the subprogram and that generates an interface file with indications of characteristics of the parameter. The storage device also comprises a stub generator that reads the interface file and that generates a stub routine that converts integer and logical parameters from 32-bit to 64-bit. Each of the stubs receives a set of parameter values, generates the parameter from the received set of parameter values, and invokes the subprogram with the values for the parameter. The processor runs the interface generator and the stub generator.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION

In accordance with methods and systems operating in accordance with the principles of the present invention, an automatic method of generating 32 to 64 bit conversion stubs is provided. This method allows callers to invoke a 32-bit interface to call the underlying 64-bit code, thus maintaining backward compatibility for pre-existing 32-bit code without having to rewrite the 32-bit code.

Overview

Methods and systems operating in a manner that is consistent with the present invention provide a script that scans the 32-bit source code and that generates an interface file for each subprogram. This file defines the signature for the associated subprogram, including its name, its parameters, and each parameter's type. This script then scans the 32-bit source code again and inserts code-generator statements into each interface file. These code-generator statements provide meaningful information about the integer parameters to facilitate the automatic generation of 64-bit interfaces. After the code-generator statements are added, another script is run that reads each interface file and automatically generates a number of stub routines, which serve as the 32-bit interfaces to the 64-bit subprogram.

Implementation Details

Figure 1:
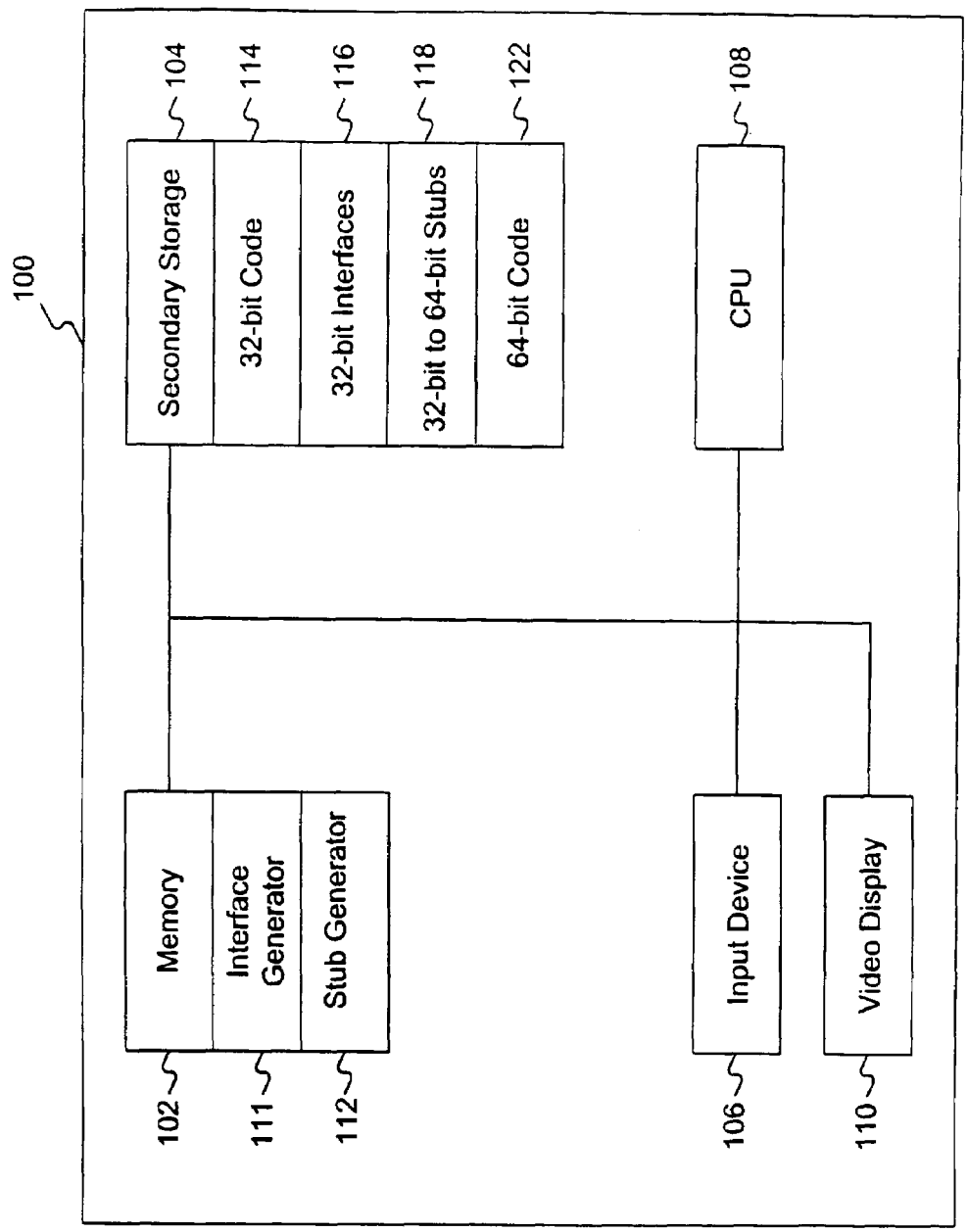
FIG. 1 depicts a data processing system suitable for use with methods and systems consistent with the present invention.

FIG. 1 depicts a data processing system 100 suitable for use with methods and systems consistent with the present. Data processing system 100 includes a memory 102, a secondary storage device 104, an input device 106, a central processing unit (CPU) 108, and a video display 110. In the memory 102 resides an interface generator 111 and a stub generator 112. Interface generator 111 reads 32-bit source code 114 in secondary storage 104, and generates 32-bit interfaces 116, one for each subprogram encountered in the source code. Stub generator 112 reads 32-bit interface files 116 and generates 32 to 64 bit conversion stubs 118 so that 32-bit code 114 can utilize the 32 to 64 bit conversion stubs 118 to invoke the 64-bit code 122.

Following is the definition of the 32-bit interface file, where the words INTERFACE, SUBROUTINE, FUNCTION, and END are keywords and the word TYPE represents any valid Fortran type (i.e., INTEGER, LOGICAL, REAL, CHARACTER, or COMPLEX):

TABLE 1

INTERFACE Interface_Name
    {SUBROUTINE | TYPE FUNCTION} (Parameter1,
    [Parameter2, . . . , ParameterN])
    TYPE Parameter1
    TYPE Parameter2
    . . .
    TYPE ParameterN
    END SUBROUTINE
END INTERFACE Following is an example of a 32-bit interface file for the CAXPY Fortran 77 subprogram, which performs the addition of two vectors X and Y and adds a constant Alpha:

TABLE 2

INTERFACE CAXPY
    SUBROUTINE CAXPY (N, ALPHA, X, INCX, Y, INCY)
    INTEGER :: N
    COMPLEX :: ALPHA
    COMPLEX :: X (*)
    INTEGER :: INCX
    COMPLEX :: Y (*)
    INTEGER :: INCY
    END SUBROUTINE
END INTERFACE

Figure 2:
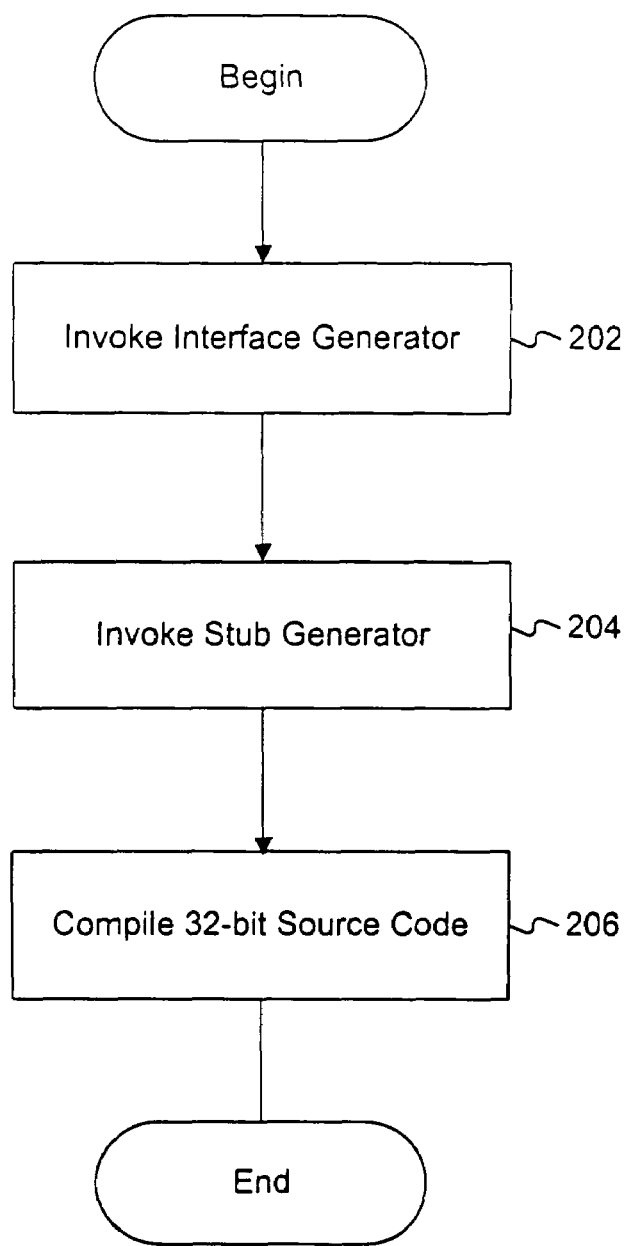
FIG. 2 depicts a flow chart of the steps performed to automatically generate 64-bit interfaces in accordance with methods and systems consistent with the present invention.

FIG. 2 depicts a flowchart of the steps performed by methods and systems consistent with the present invention when creating the stubs. The first step performed is to invoke the interface to generate the 32-bit interface file from the 32-bit code (step 202). In this step, the interface generator scans the 32-bit source code and creates an interface file for each subprogram contained in it according to the definition provided above. The interface generator then adds code-generator statements to the interface file. It parses the arguments of each subprogram and adds a comment line that provides meaningful information so that the stub generator can generate a stub. For example, such meaningful information may include a type and shape of a given parameter. After invoking the interface generator, the user invokes the stub generator (step 204). The stub generator reads the interface files and generates stub routines by using the code-generator statements. The stub generator also produces interfaces for the stub routines. These interfaces are used to resolve references during compilation of the 64-bit program. Once generated, the stubs are compiled and can be linked into the 32-bit source code to enable their invocation from the 32-bit source code (step 206).

Figure 3A:
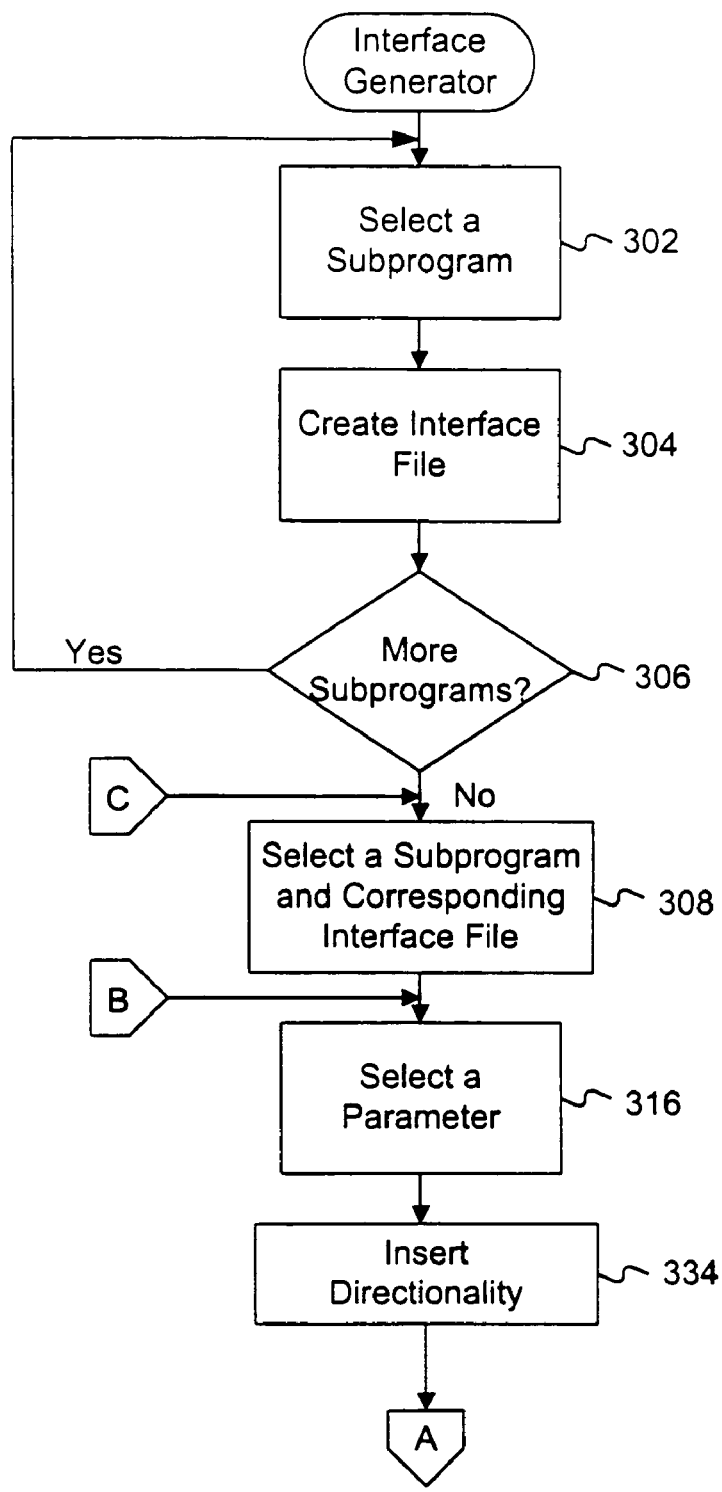
FIGS. 3A and 3B depict a flow chart of the steps performed by the interface generator depicted in FIG. 2.
Figure 3B:
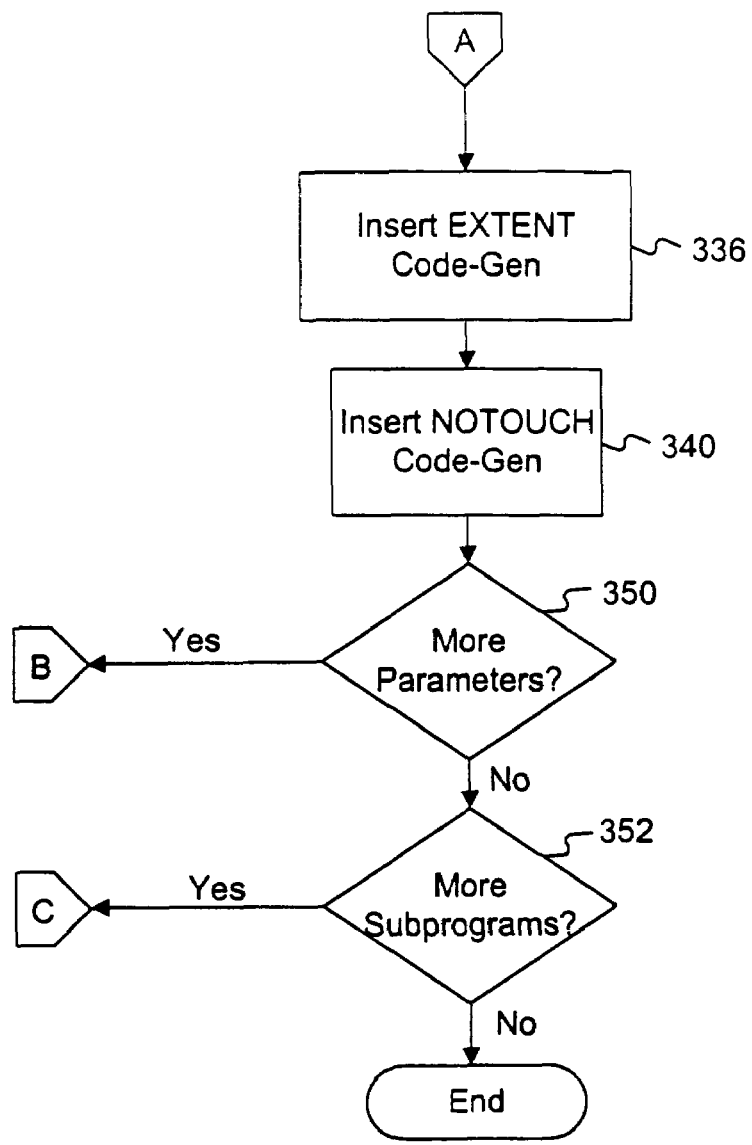

FIGS. 3A and 3B depict a flowchart of the steps performed by the interface generator. The first step performed by the interface generator is to select a subprogram from the 32-bit code (step 302). Next, the interface generator creates an interface file for this subprogram (step 304). In this step, the interface generator generates a definition for the subprogram similar to that described above with respect to Table 1. After creating the interface file, the interface generator determines whether there are more subprograms in the 32-bit code (step 306). If so, processing continues to step 302 to create additional interface files for each subprogram.

Otherwise, the interface generator performs a second pass through the 32-bit code by selecting a subprogram and its corresponding interface file (step 308). Next, the interface generator selects a parameter within the subprogram (step 316).

The arguments for the subprograms in the 32-bit code contain comments that provide a significant amount of information about that parameter, such as whether the parameter is an input, output, or input/output parameter; its type; and the meaning associated with its values. In accordance with methods and systems consistent with the present invention, the parameter descriptions closely conform to the following form:

TABLE 3

| Parameter Name | Comment Line in Source Code |
|---|---|
| N | (input) INTEGER |
| | The order of the matrix A. N >= 0. |
| D | (input/output) COMPLEX array, dimension (N) |
| | On entry, the diagonal elements of A. |
| | On exit, the diagonal elements DD. |
| L | (input/output) COMPLEX array, dimension (N-1) |
| | On entry, the subdiagonal elements of A. |
| | On exit, the subdiagonal elements of LL and DD. |
| SUBL | (output) COMPLEX array, dimension (N-2) |
| | On exit, the second subdiagonal elements of LL. |
| NRHS | (input) INTEGER |
| | The number of right hand sides, i.e., the number of columns of matrix B. NRHS >= 0. |
| B | (input/output) COMPLEX array, dimension (LDB, NRHS) |
| | On entry, the N-by-NRHS right hand side matrix B. |
| | On exit, if INFO = 0, the N-by-NRHS solution matrix X. |
| LDB | (input) INTEGER |
| | The leading dimension of the array B. LDB >= max (1, N). |
| IPIV | (input) INTEGER array, dimension (N) |
| | Details of the interchanges and block pivot. If IPIV (K) > 0, 1 by 1 pivot, and if IPIV (K) = K + 1 an interchange done; If IPIV (K) < 0, 2 by 2 pivot, no interchange required. |
| INFO | (output) INTEGER |
| | = 0: successful exit |
| | < 0: if INFO = -k, the k-th argument had an illegal value |
| | > 0: if INFO = k, D (k) is exactly zero. The factorization has been completed, but the block diagonal matrix DD (that is D (K)) is exactly singular, and division by zero will occur if it is used to solve a system of equations. |
| INPUT | The value of an intent(input) parameter is expected to be set by the calling routine. This value may or may not be changed in the callee routine but any changes are not propagated back to the caller. |
| OUTPUT | The value of an intent(output) parameter is undefined when entering the callee routine. This parameter's value is expected to be set by the callee routine and passed back to the caller. |
| INOUT | The value of an intent(inout) parameter is expected to be set by the calling routine. This value may or may not be changed in the callee routine and any changes are propagated back to the caller. |

Next, the interface generator inserts the directionality or intent of the parameter into the interface file (step 334). In this step, the interface generator determines if the parameter is an input/output, input, or output parameter by examining the comments in the source code. After making this determination, either an input/output, input, or output code-generator statement is inserted into the interface file. The parameters to be considered are integer or logical parameters as all other parameter types are passed directly through the 32 to 64 bit conversion stub.

If the parameter is an input/output parameter, it is passed with input and output semantics, as required by the language. In the case of C interfaces, this means that the C interface passes a scalar parameter by reference. This parameter allows the compiler to perform optimizations across subprogram boundaries.

If the parameter is an INPUT parameter, it is passed with input semantics. In the case of C interfaces, this means that the C interface can pass the parameter by value. This parameter allows the compiler to perform optimizations across subprogram boundaries.

If the parameter is an OUTPUT parameter, it is passed with output semantics. In the case of C interfaces, this means that the C interface needs to pass a scalar parameter by reference. This parameter allows the compiler to perform optimizations across subprogram boundaries.

After inserting the directionality, the interface generator inserts the size of the parameter along each of its dimensions. After inserting the size of the parameter, an EXTENT-code generator statement describing the size and dimensions of a parameter is inserted into the interface file as shown in FIG. 3B (step 336). Again, the parameters to be considered are either integer or logical non-scalar parameters.

The following is an example of the affect of the EXTENT statement on the generated code:

TABLE 4

```
INTERFACE PAREXTENT
   SUBROUTINE SUB (M,N,A)
      INTEGER :: M !#INPUT
      INTEGER :: N !#INPUT
      INTEGER, DIMENSION(:,:) :: A !#EXTENT(M,N),#INOUT
   END SUBROUTINE
END INTERFACE
```

The above interface description generates the following 32 to 64 bit conversion stub when passed to the stub generator:

TABLE 5

```
1   SUBROUTINE SUB(M,N,A)
2   IMPLICIT NONE
3
4   INTEGER*4 M
5   INTEGER(8) :: M__64
6   INTEGER*4 N
7   INTEGER(8) :: N__64
8   INTEGER*4 M
9   INTEGER*4 A(M,*)
10  INTEGER(8),DIMENSION(:,:),ALLOCATABLE :: A__64
11  INTEGER IA
12  INTEGER JA
13  INTEGER*8 MEMSTAT,MAX
14  INTRINSIC MAX
15
16  M__64 = M
17  N__64 = N
18  ALLOCATE(A__64(MAX(1,M),MAX(1,N)),STAT=MEMSTAT)
19  IF(MEMSTAT.NE.0) THEN
20     CALL DSS_MEMERR__64('SUB',MAX(1,M,N)*1__8)
21     STOP
22  ENDIF
23  DO JA = 1,N
24  DO IA = 1,M
25     A__64(IA,JA) = A(IA,JA)
26  END DO
```

TABLE 5-continued

```
27  END DO
28
29  CALL SUB__64(M__64,N__64,A__64)
30
31  DO JA = 1,N
32  DO IA = 1,M
33     A(IA,JA) = A__64(IA,JA)
34  END DO
35  END DO
36  DEALLOCATE(A__64)
37  RETURN
38  END
```

Lines 1-9 contain declarations. Line 10 declares a two-dimensional integer 64-bit array that can be dynamically allocated. Lines 11-12 declare loop indices. Lines 13-14 declare local variables. Lines 16-17 copy integer parameters with intent(input) to their 64-bit counterparts. Line 18 allocates memory to contain the 32-bit integer, two-dimensional array (A). Lines 19-22 ensure the memory was successfully allocated and report the failure and exit if the allocation was unsuccessful. Lines 23-27 copy the elements of the 32-bit array (A) into the newly allocated 64-bit array (A__64), since the array was declared as intent(inout). Line 29 calls the 64-bit routine. Lines 31-35 copy the elements of the 64-bit array (A__64) into the original 32-bit array (A), since the array was declared as intent(inout). Line 36 deallocates the 64-bit array.

Here is another example of the EXTENT (expr[,expr]):
INTEGER,DIMENSION(:) ::A!#EXTENT(N)

In this example, the parameter A is a 1 dimensional array with N elements.

Here is another example of the EXTENT (expr[,expr]):
INTEGER, DIMENSION(:,:) ::B!#EXTENT(2*N,MAX (M,N))

In this example, the parameter B is a 2 dimensional array of 2*N elements in the first dimension, and MAX(M,N) elements in the second dimension.

Next, the interface generator determines when a parameter should be written and describes such condition or conditions (step 340). The NOTOUCH (condition) code-generator statement is used only on parameters having either a LOGICAL or INTEGER type. An example of the NOTOUCH statement follows:

```
LOGICAL,DIMENSION(:)   ::   SELECT
   !#NOTOUCH(HOWMNY.EQ.'A')
```

In this example, no elements to the 1 dimensional array SELECT should be written by the 32- to 64-bit interface. This is usually necessary when a routine has parameters which are not used and the user may send a "dummy" parameter in the place of an unused parameter.

Another example of a NOTOUCH statement is:
INTEGER :: IL !#NOTOUCH(RANGE.EQ.'A'.OR. RANGE.EQ.'V')

In this example, the scalar, integer parameter IL should not be written by the 32-bit to 64-bit interface when RANGE parameter equals either the character "A" or the character "V".

Next, the interface generator determines if more parameters remain to be processed (step 350), and if so, processing continues to step 316. Otherwise, the interface generator determines if more subprograms remain for processing (step 352), and if so, processing continues to step 308. If no more subprograms remain to be processed, processing ends.

For an example of inserting code-generator statements into an interface file, consider the following. The CSTSV subprogram computes the solution to a complex system of linear equations A*X=B, where A is an N-by-N symmetric tridiagonal matrix and X and B are N-by-NRHS matrices. The following interface file, as shown in Table 6, is generated by examining the CSTSV 32-bit source to extract the parameter list and the parameter declarations.

TABLE 6

```
INTERFACE
    SUBROUTINE CSTSV (N, NRHS, L, D, SUBL, B, LDB, IPIV,
    INFO)
        INTEGER :: N
        INTEGER :: NRHS
        COMPLEX :: L (*)
        COMPLEX :: D (*)
        COMPLEX :: SUBL (*)
        COMPLEX :: B (LDB, *)
        INTEGER :: LDB
        INTEGER :: IPIV (*)
        INTEGER :: INFO
    END SUBROUTINE
END INTERFACE
```

By parsing the comments in the source code, the interface generator can add code-generator statements to the interface file. For instance, the following example line in the 32-bit source code:

| N | (input) INTEGER |
|---|---| allows the interface generator to insert the #INPUT code-generator statement into the interface file associated with the parameter N.

Also, the following exemplary 32-bit source code declarations:

| D | (input/output) COMPLEX array, dimension (N) |
|---|---|
| L | (input/output) COMPLEX array, dimension (N-1) |
| SUBL | (output) COMPLEX array, dimension (N-2) |
| NRHS | (input) INTEGER | allows the interface generator to not only associate the #INOUT statement with the parameters D and L, but also the #OUTPUT statement can be associated with the SUBL parameter and the #INPUT statement to the NRHS parameter. In addition, the declaration of D gives the interface generator enough information to construct a default value for the parameter N.

Furthermore, the following exemplary 32-bit declaration for B:

| B | (input/output) COMPLEX array, dimension (LDB, NRHS) |
|---|---| provides enough information to associate the #INOUT statement with B, create a default value for the LDB and NRHS parameters.

This process continues until all the comments have been examined and code-generator statements generated. The final result is an interface file, as shown in Table 7, populated with code-generator statements.

TABLE 7

```
INTERFACE
    SUBROUTINE CSTSV (N, NRHS, L, D, SUBL, B, LDB, IPIV,
    INFO)
        INTEGER :: N !#INPUT, #D (#SIZE (D, #DIM=1))
        INTEGER :: NRHS !#D (#SIZE (B, #DIM=2))
        COMPLEX :: L (*) !#INOUT
        COMPLEX :: D (*) !#INOUT
        COMPLEX :: SUBL (*) !#OUTPUT
        COMPLEX :: B (LDB, *) !#INOUT
        INTEGER :: LDB !#D (#STRIDE (B, #DIM=2))
        INTEGER :: IPIV (*) !#OUTPUT
        INTEGER :: INFO !#INFO
    END SUBROUTINE
END INTERFACE
```

Figure 4A:
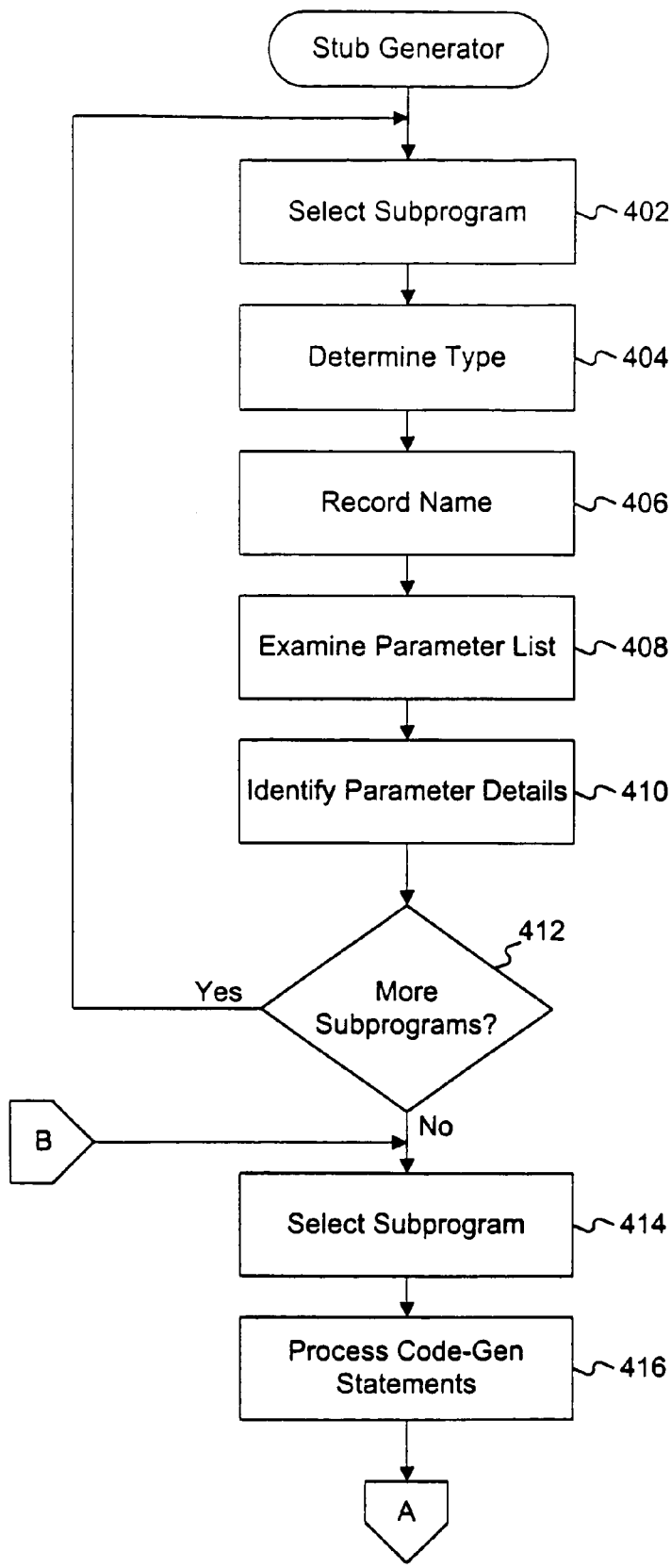
FIGS. 4A and 4B depict a flow chart of the steps performed by the stub generator.
Figure 4B:
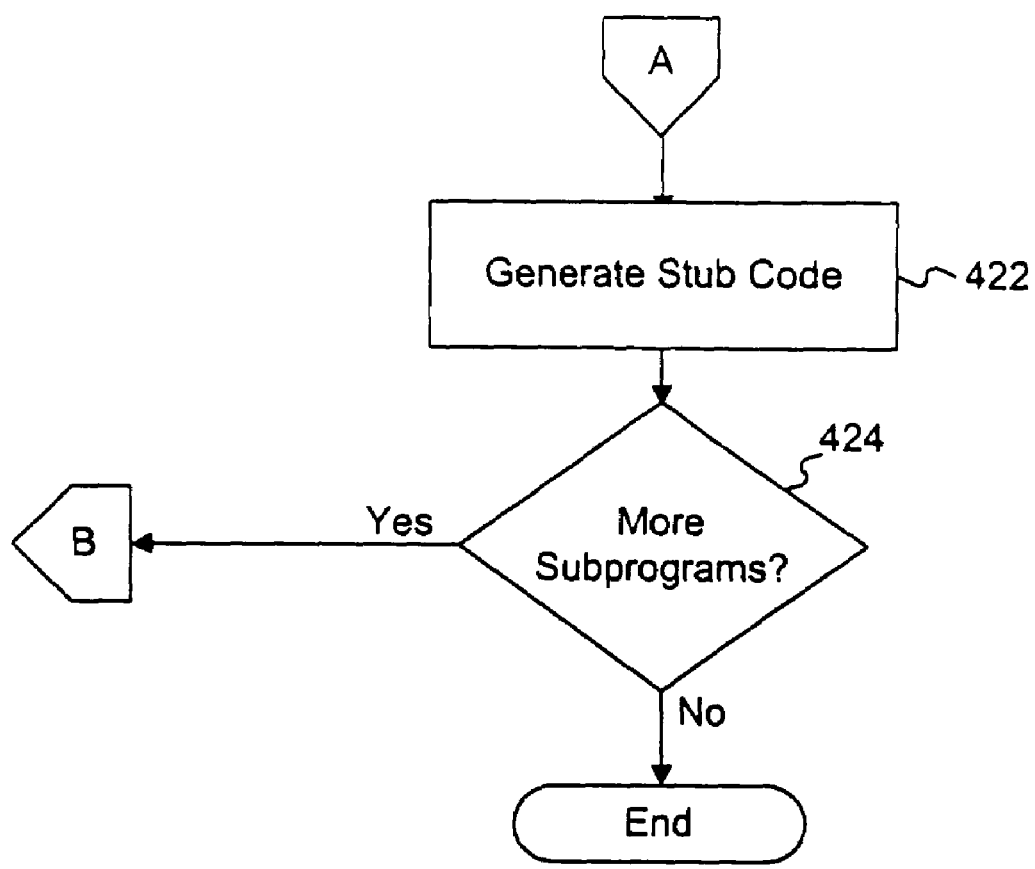

FIGS. 4A and 4B depict a flowchart of the steps performed by the stub generator. The stub generator performs two passes through the interface file that has been marked up with the code-generator statements. The first pass discovers information regarding each subprogram and its parameters and begins to populate a hash table with such information. The second pass through each subprogram provides more detailed information to the hash table. Once the hash table has been populated, the stub generator generates stubs using this information. The first step performed by the stub generator is to select a subprogram (step 402). Next, the stub generator determines whether the subprogram is a subroutine (i.e., does not return a return code) or is a function (i.e., returns a return code) (step 404). Next, the stub generator records the name of the subprogram into a hash table, one entry for each subprogram (step 406). Each hash table entry has the following items of information where items 2-14 are specified for each parameter of the subprogram:

TABLE 8

1) Subprogram Name
2) Parameter Name
3) Type (logical, real, double, etc.)
4) Rank (shape)
5) Optional: true/false
6) Info: true/false or expression indicating whether an error has occurred.
7) Work: expression indicating amount of memory needed for this parameter.
8) Sizer: this parameter describes the size of another parameter, the name of that parameter is stored in this field.
9) Mysizer: if another parameter is a sizer for this parameter, that parameter's name is stored in this field.
10) Strider: if this parameter is a strider for another parameter, then its name is stored in this field.
11) Mystrider: if another parameter acts as the strider for this parameter, then its name is stored in this entry.
12) Intent: undefined, input, output, or i/o.

After recording the name, the stub generator examines the parameter list to determine the number of parameters as well as their name for the subprogram and stores this information into the hash table (step 408). The stub generator then identifies the details of each parameter including its shape and type and stores this into the hash table (step 410). After identifying the parameter details, the stub generator determines if there are more subprograms (step 412), and if so, proceeds back to step (402).

Otherwise, the stub generator proceeds to the second pass by selecting a subprogram (step 414). Next, the stub generator processes the code-generator statements by inserting various information into the hash table (step 416). The following table indicates the code-generator statements and the processing that occurs for each one:

TABLE 9

| Code-Generator Statement | Processing That Occurs |
|---|---|
| If (expression, default1, else, default2) | Save the expression and the two possible default values. Include code in the performance test that tests the expression and chooses one of the default values if the value for the parameter is not read from input. |
| Inout, Input, Output | Set the intent field accordingly. |
| Extent (expression) | Copy the size along each of the dimensions to the "extent" entry. |
| NoTouch (condition) | Copy the condition which indicates when this parameter should not be written into the "no touch" entry. |

Next, the stub generator generates the stub code for the interface (step 422). An example of the INPUT, OUTPUT and INOUT code-generator statement follows:

TABLE 10

```
INTERFACE PARINTENT
    SUBROUTINE SUB(N, M, K, A)
    INTEGER N!#INPUT
    INTEGER M!#OUTPUT
    INTEGER K!#INOUT
    END SUBROUTINE
END INTERFACE
```

When the interface description is processed through the stub generator, the following 32 to 64 bit conversion source is generated:

TABLE 11

| | |
|---|---|
| 1 | SUBROUTINE SUB (N,M,K) |
| 2 | IMPLICIT NONE |
| 3 | |
| 4 | INTEGER*4 N |
| 5 | INTEGER(8) :: N__64 |
| 6 | INTEGER*4 M |
| 7 | INTEGER(8) :: M__64 |
| 8 | INTEGER*4 K |
| 9 | INTEGER(8) :: K__64 |
| 10 | |
| 11 | N__64 = N |
| 12 | |
| 13 | K__64 = K |
| 14 | |
| 15 | CALL SUB__64(N__64,M__64,K__64) |
| 16 | |
| 17 | M = M__64 |
| 18 | K = K__64 |
| 19 | RETURN |
| 20 | END |

Lines 5, 7, and 9 declare 64-bit integers for the three integer parameters that are passed to the 32 to 64 bit stub. Lines 4, 6 and 8 declare the incoming 32-bit integer parameters. Line 11 copies the incoming value to the 64-bit parameter (N__64) that will be passed to the 64-bit routine since N was indicated to be an intent(input) parameter. Line 13 copies the incoming value to the 64-bit parameter (K__64) that will be passed to the 64-bit routine since K was indicated to be an intent(inout) parameter. Since parameter M was declared intent(output), the incoming value is not copied from the 32-bit to the 64-bit parameter. Line 15 calls the 64-bit routine with the 64-bit parameters. Line 17 copies the value returned by the 64-bit routine (M__64) back to the 32-bit parameter (M) to the caller since M was declared intent(output). Line 18 copies the value returned by the 64-bit routine (K__64) back to the 32-bit parameter (K) to be returned to the caller since K was declared intent(inout). Since parameter N was declared intent(input), the value of the 64-bit parameter (N__64) is not copied back to the 32-bit parameter.

After generating the stub code, the stub code generator determines if there are more subprograms (step 424) and, if so, continues to step (414). Otherwise, processing ends.

Although the present invention has been described with reference to a preferred embodiment thereof, those skilled in the art will know of various changes in form and detail which may be made without departing from the spirit and scope of the present invention as defined in the appended claims and their full scope of equivalents.

What is claimed is:

1. A method in a data processing system, comprising the steps of:

receiving 32-bit source code;

generating, from the 32-bit source code, a 32-bit interface file including statements describing characteristics of parameters in the 32-bit source code, wherein generating a 32-bit interface file includes invoking an interface generator that:

scans the 32-bit source code and creates the interface file according to a definition; and adds to the interface file the statements describing characteristics of the parameters by parsing the 32-bit source code; and automatically generating, based on the statements in the 32-bit interface file, a 32-bit to 64-bit conversion stub that is used by the 32-bit source code to invoke 64-bit code, wherein automatically generating a 32-bit to 64-bit conversion stub includes invoking a stub generator that:

reads the 32-bit interface file to populate a hash table with information identifying the parameters in the interface file;

re-reads the 32-bit interface file to populate the hash table with information indicating processing that occurs for the statements in the interface file; and generates the 32-bit to 64-bit conversion stub using the hash table.

2. The method of claim 1, wherein the 32-bit source code includes at least one of an integer parameter and a logical parameter and wherein generating a 32-bit interface includes:

determining whether the at least one of an integer and logical parameter has input directionality, output directionality, or input and output directionality; and inserting into the 32-bit interface file code generator statements corresponding to the determined directionality of the at least one parameter.

3. The method of claim 1, wherein generating a 32-bit interface file includes:

adding to the interface file statements indicating a number of dimensions of at least one parameter and a number of elements in each dimension.

4. The method of claim 1, wherein the characteristics include an indication of a conditional value for at least one of the required parameters.

5. The method of claim 1, wherein the characteristics include an indication of whether at least one of the required parameters is used to contain a return value.

6. The method of claim 1, wherein the characteristics include a directionality of at least one of the required parameters.

7. The method of claim 1, wherein the characteristics include an indication of whether at least one of the required parameters returns a multidimensional variable.

8. The method of claim 1, wherein the characteristics include an indication of whether a size of at least one of the required parameters is based on another one of the required parameters.

9. The method of claim 1, wherein the characteristics include an indication of whether at least one of the required parameters is a work space parameter.

10. A computer-readable memory device containing instructions for controlling a data processing system to perform a method comprising the steps of:
   receiving 32-bit source code;
   generating, from the 32-bit source code, a 32-bit interface file including statements describing characteristics of parameters in the 32-bit source code, wherein generating a 32-bit interface file includes invoking an interface generator that
   scans the 32-bit source code and creates the interface file according to a definition; and
   adds to the interface file the statements describing characteristics of the parameters by parsing the 32-bit source code; and
   automatically generating, based on the statements in the 32-bit interface file, a 32-bit to 64-bit conversion stub that is used by the 32-bit source code to invoke 64-bit code, wherein automatically generating a 32-bit to 64-bit conversion stub includes invoking a stub generator that
   reads the 32-bit interface file to populate a hash table with information identifying the parameters in the interface file;
   re-reads the 32-bit interface file to populate the hash table with information indicating processing that occurs for the statements in the interface file; and
   generates the 32-bit to 64-bit conversion stub using the hash table.

11. The computer-readable memory device of claim 10, wherein the 32-bit source code has a subprogram with a parameter and wherein generating a 32-bit interface file includes:
   determining whether the parameter in the subprogram has input directionality, output directionality, or input and output directionality; and
   inserting into the 32-bit interface file code generator statements corresponding to the determined directionality of the parameter in the subprogram.

12. The computer-readable memory device of claim 10, wherein generating a 32-bit interface file includes:
   adding to the interface file statements indicating a number of dimensions of at least one parameter and a number of elements in each dimension.

13. The computer-readable memory device of claim 10, wherein the characteristics include an indication of a conditional value for at least one of the required parameters.

14. The computer-readable memory device of claim 10, wherein the characteristics include an indication of whether at least one of the required parameters is used to contain a return value.

15. The computer-readable memory device of claim 10, wherein the characteristics include a directionality of at least one of the required parameters.

16. The computer-readable memory device of claim 10, wherein the characteristics include an indication of whether at least one of the required parameters returns a multidimensional variable.

17. The computer-readable memory device of claim 10, wherein the characteristics include an indication of whether a size of at least one of the required parameters is based on another one of the required parameters.

18. The computer-readable memory device of claim 10, wherein the characteristics include an indication of whether at least one of the required parameters is a work space parameter.

19. A data processing system comprising:
   means for receiving 32-bit source code;
   means for generating, from the 32-bit source code, a 32-bit interface file including statements describing characteristics of parameters in the 32-bit source code, wherein the means for generating a 32-bit interface file includes means for invoking an interface generator that scans the 32-bit source code and creates the interface file according to a definition; and
   adds to the interface file the statements describing characteristics of the parameters by parsing the 32-bit source code; and
   means for automatically generating, based on the statements in the 32-bit interface file, a 32-bit to 64-bit conversion stub that is used by the 32-bit source code to invoke 64-bit code, wherein the means for automatically generating a 32-bit to 64-bit conversion stub includes means for invoking a stub generator that
   reads the 32-bit interface file to populate a hash table with information identifying the parameters in the interface file;
   re-reads the 32-bit interface file to populate the hash table with information indicating processing that occurs for the statements in the interface file; and
   generates the 32-bit to 64-bit conversion stub using the hash table.

20. The system of claim 19, wherein the 32-bit source code includes at least one of an integer parameter and a logical parameter and wherein the means for generating a 32-bit interface includes:
   means for determining whether the at least one of an integer and logical parameter has input directionality, output directionality, or input and output directionality; and
   means for inserting into the 32-bit interface file code generator statements corresponding to the determined directionality of the at least one parameter.

21. The system of claim 19, wherein the means for generating a 32-bit interface file includes:
   means for adding to the interface file statements indicating a number of dimensions of at least one parameter and a number of elements in each dimension.

22. The system of claim 19, wherein the characteristics include an indication of a conditional value for at least one of the required parameters.

23. The system of claim 19, wherein the characteristics include an indication of whether at least one of the required parameters is used to contain a return value.

24. The system of claim 19, wherein the characteristics include a directionality of at least one of the required parameters.

25. The system of claim 19, wherein the characteristics include an indication of whether at least one of the required parameters returns a multidimensional variable.

26. The system of claim 19, wherein the characteristics include an indication of whether a size of at least one of the required parameters is based on another one of the required parameters.

27. The system of claim 19, wherein the characteristics include an indication of whether at least one of the required parameters is a work space parameter.

* * * * *